United States Patent [19]

Ragnegård

[11] Patent Number: 4,655,920
[45] Date of Patent: Apr. 7, 1987

[54] ROTATING DISC FILTER

[75] Inventor: Samuel Ragnegård, Hedemora, Sweden

[73] Assignee: AB Hedemora Verkstader, Sweden

[21] Appl. No.: 732,807

[22] Filed: May 10, 1985

Related U.S. Application Data

[63] Continuation of Ser. No. 577,913, Feb. 7, 1984, abandoned.

[30] Foreign Application Priority Data

Feb. 10, 1983 [SE] Sweden ............................. 8300697

[51] Int. Cl.$^4$ ............................................. B01D 33/02
[52] U.S. Cl. ..................................... 210/331; 210/345; 210/347; 210/487
[58] Field of Search ............... 210/331, 345, 347, 406, 210/486, 487

[56] References Cited

U.S. PATENT DOCUMENTS

| | | | |
|---|---|---|---|
| 2,844,255 | 7/1958 | Cavenah | 210/345 |
| 2,885,083 | 5/1959 | Peterson | 210/331 |
| 2,894,632 | 7/1959 | Myers | 210/331 |
| 3,187,899 | 6/1965 | Prizler | 210/331 |
| 3,193,105 | 7/1965 | Putnam | 210/331 |
| 3,209,915 | 10/1965 | Guttkowski | 210/487 |
| 3,471,026 | 10/1969 | Riker | 210/331 |
| 3,491,886 | 1/1970 | Glos | 210/331 |
| 3,536,195 | 10/1970 | Oden | 210/331 |
| 3,948,779 | 4/1976 | Jackson | 210/487 |
| 4,077,887 | 3/1978 | Langvik | 210/331 |

FOREIGN PATENT DOCUMENTS

| | | | |
|---|---|---|---|
| 28649 | 7/1932 | Netherlands | 210/331 |
| 79654 | 11/1931 | Sweden . | |

Primary Examiner—Ernest G. Therkorn
Attorney, Agent, or Firm—Pollock, Vande Sande & Priddy

[57] ABSTRACT

A rotating disc filter consists of disc sectors of preferably rustfree or acidproof steel about a filter shaft (9). Saddles (12) of a folded plate (1) form sector deck and support for filter cloth (4), and the troughs (13) of the folded plate together with the filter cloth abutting the saddles (12) form internal filtrate channels (11) extending from the outer periphery of the sector towards the filter shaft (9). Such a construction renders it possible to obtain sectors combining the requirements of large open filter cloth area, small internal volume affording for the filter operation an advantageously great ratio between filter surface and internal filtrate volume, high stability against lateral forces, and simple manufacture.

2 Claims, 6 Drawing Figures

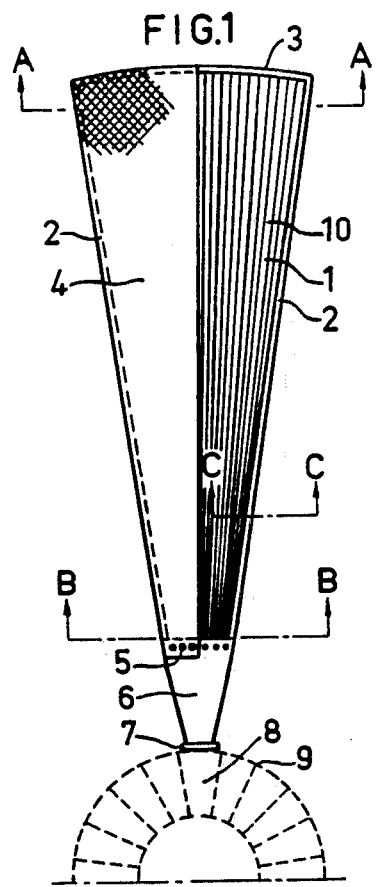
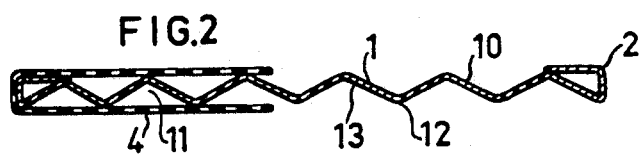
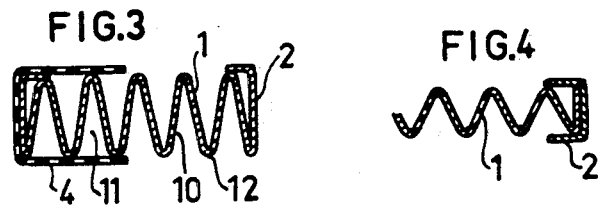

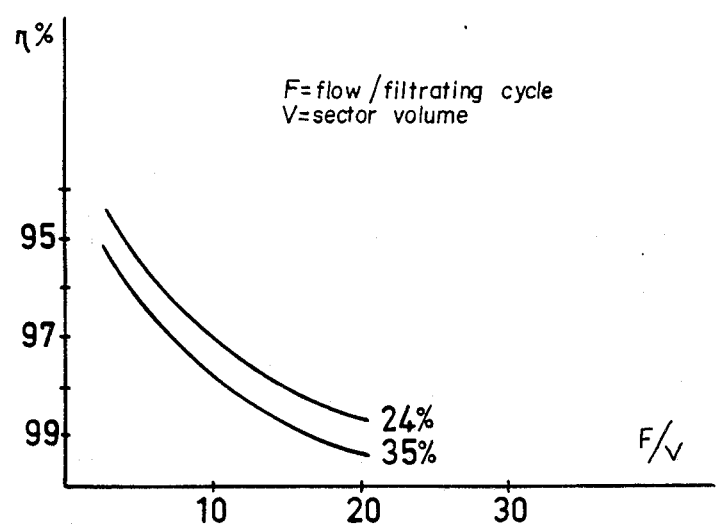
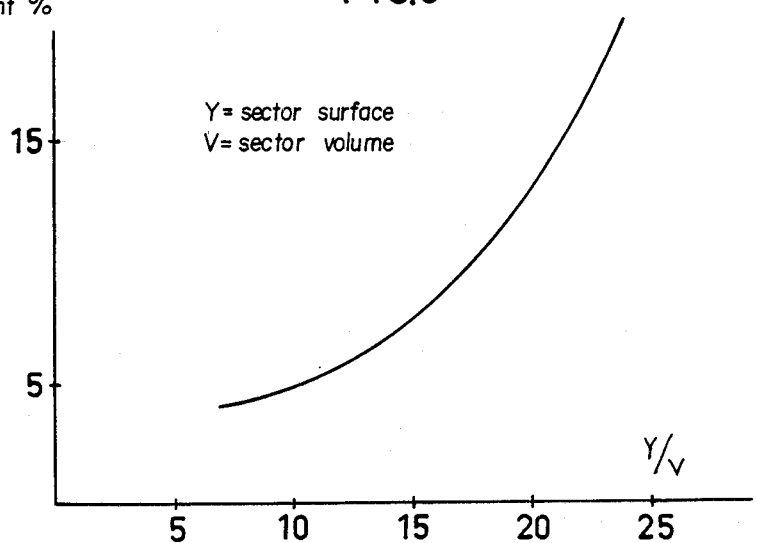

ROTATING DISC FILTER

This application is a continuation of application Ser. No. 577,913, filed Feb. 7, 1984, now abandoned.

The present invention relates to a disc filter for dewatering a suspension.

Disc filters are common within for instance cellulose and paper industries for cleaning backwater and for thickening fiber suspensions. Such a filter consists of a horizontal shaft having axial channels ending in one end of the shaft and a number of filter discs mounted radially on the shaft, each disc consisting of a number of sectors each of which is connected to a respective channel in the shaft. The shaft with the discs are to about 50% immersed into a trough containing the fiber suspension to be filtered. The end of the shaft, in which the channels issue, is connected to a so called suction head which is usually continuous in a barometric fall pipe or is connected to a vacuum pump. When the shaft and the discs rotate in the trough, the fiber suspension if filtered therein through the filter discs owing to the pressure difference between the fiber suspension in the trough and the interior of the filter discs, caused by the barometric fall pipe or the vacuum pump. A fiber layer is formed on the part of the discs immersed in the trough. In order to make the process continuous the fiber layers are removed from the disc sectors as they come up out of the trough so that they are free from fibers when they again are immersed into the trough.

A disc sector in known configuration usually consists of two decks of perforated plates joined with intermediate ribs at an appropriate distance from each other, so that internal filtrate channels are formed. About the outer periphery of the sector there are U-ledges and the inner periphery is connected to a funnel having a flange or a pipe for the connection to the disc filter shaft. A filter cloth, preferably in the form of a cloth bag made of shrinkable synthetic material, is arranged over the sector deck. The filter cloth is drawn over the sector and is then allowed to shrink so that it is tightly closed around the sector. Instead of perforated plate as deck other types of pervious means may be used such as expanded metal, wire net etc. The sector material is preferably rustless steel or acidproof steel to be durable for existing environments and temperatures.

As the filtering process proceeds a successive blocking of the filter cloth takes place. In order to counteract this, the disc filter is provided with a spray which sprays the cloth clean after the fiber layer has been removed. It has in practical operation been proved, that it is in that connection of great importance that the deck of perforated plate or corresponding means comprising the support for the cloth has as large an open area as possible since this to a great extent makes it easier to keep the cloth clean and open. One can apparently observe how the blocking starts in the part of the cloth abutting the unperforated surface of the support.

Upon cleaning of a fiber containing water on a disc filter, the filtration occurs first through the clean-sprayed filter cloth but as the filtering cycle proceeds a fiber layer is formed on the filter cloth. Hereby, the filtrate will become successively cleaner during the filtering cycle since the filter medium becomes more and more impermeable by the building-up of fibers. The filtrate flow is divided up in the suction head of the filter so that two filtrates are discharged, one so called prefiltrate from the beginning phase or period of the filtering cycle and one so called clear filtrate. In order to obtain the boundary between prefiltrate and clear filtrate as sharp as possible it is of importance that each sector has as small volume as possible since refilling of the filtrate in each sector counted as the ratio between flow and volume is then greatest. What theoretically decides how small the volume of the sector can be for an acutual flow is the maximum flow rate that can by way of experience be achieved in the sector.

Upon thickening of fiber suspensions on disc filters, also called dewatering, the desire is often to achieve as high dry content of the dewatering fiber mass as possible. In order to achieve as high dry content as possible it is necessary, that the sector, the interior channels of which during the part of the filtering cycle are below the level in the trough, are completely filled with the flowing filtrate, and during the time the sector comes up above the level in the trough and up to the removal of the fiber layer, becomes completely emptied from filtrate. Otherwise, the remaining filtrate will, at the removal of the fiber layer, flow back out through the filter cloth and mix with the dewatered fiber mass, so called re-wetting, whereby the achieved dry content on the sector is decreased. A condition for managing to empty the sector completely is that the discharging filtrate is displaced by corresponding amount of air sucked into the sector through the fiber layer. How large amount of air that manages to be sucked through the fiber layer from the moment the sector leaves the suspension in the trough until it comes up to said removal depends on the time, the pressure difference over the fiber layer as well as the permeability of the fiber layer. Particularly in fiber masses having low permeability, the problem can arise of having time to suck through a sufficient amount of air for emptying the sector completely before the removal. A usual way to try to avoid this problem is to make an opening in the fiber layer by means of a water or air spray and in such a manner give admission to air. However, this method has the disadvantage that the air flow through the fiber layer rapidly goes down, whereby lower final dry content is achieved. Another disadvantage with this method is, that fibers from the sector are blown around and settle on different parts of the filter resulting in risks for operation disturbances. The best way of getting the sector completely emptied before the removal is to make the volume of the sector as small as possible or, in other words, the ratio between the surface of the sector and its volume as large as possible. As described above for cleaning backwater, also here is valid that what theoretically decides how small the volume of the sector can be for an actual flow is the maximum flow rate that by way of experience can be achieved in the sector.

The construction of the sector results in the fact that the filtrate channels within the sector have two of the four walls consisting of the perforated deck, which in this connection can be regarded as a raw surface having a friction factor with a comparatively high value. This fact causes the flow rate in the sector channels to be obviously lower than in a sector having smooth channels.

The way of building sectors up to now makes it difficult and in many cases impossible to manufacture sectors to meet the requirements for a sector according to above description. Thus for instance, the requirement of as large an open area of the means comprising support for the filter cloth as possible can not be combined with the requirement of as small a volume in the sector as possible since the construction is such that the two decks together with intermediate ribs consist of a stiff construction which must resist comparatively great lateral forces. This means, that increased open area of the material used as decks must be combined with increased thickness for this material in orderto maintain required strength. The space in the perforated part of the deck material is per se a volume which does not contribute to the flow in the radial channels within the sector for the filtrate, but in this respect consists of a dead volume. In order to exemplify this fact it can be mentioned, that an appropriate ratio between the surface and the volume of the sector for many applications ought to be at a minimum of 20. This means, that for a sector having a filter surface of 1 m², the volume must not exceed 5 dm³.

If an open area of 75% is desired, a thickness of 2,5 mm for the perforated plate is required in order to obtain a reasonable construction from a strength point of view and the dead volume in the perforated plate is then 2 dm² per m² sector or 40% of available volume or meaning that the ratio surface/volume is 14. A surface/volume—value considerably greater than 20 is desirable in many cases.

Another disadvantage with existing sector constructions is the fact that it is on the whole difficult to manufacture them with a sufficiently small volume since the intermediate ribs then become so thin that the whole construction becomes too weak.

Still another disadvantage is that the construction per se is comparatively complicated and thereby comparatively expensive to manufacture without nevertheless meet the requirements which should be laid thereon.

The present invention renders it possible in one and the same construction to combine the requirements of as large an open area as possible, a surface/volume-ratio of required magnitude and without limitation upwards for each case, internal filtrate channels having low flow resistance, a very stiff construction, and simple and cheap manufacture.

To achieve this the present invention relates to a rotating disc filter for dewatering a suspension, comprising a number of disc sectors having internal channels for discharging filtrate to a shaft, folded means having saddles and troughs, and a filter cloth, through which the dewatering takes place, said saddles forming a support for said filter cloth, and said troughs and said filter cloth forming said filtrate channels, and the invention is characterized in that said filtrate channels are arranged radially. In a preferred embodiment each sector consists of a plate with radial folds having increasing height towards the shaft. Thus, the saddles of the folds comprise the deck of the sector and are support or basis for the filter cloth while the troughs of the folds together with the filter cloth form radial channels having a triangular cross-section from the outer periphery of the sector inwardly towards the connection to the filter shaft. The distance between the folds is choosen such that they at the outer periphery, where the distance is largest, constitute sufficient support for the filter cloth, so that its deflection upon existing pressure difference is kept within limits reasonable by way of experience. U-ribs are arranged around the outer periphery and the sides of the sector and the inner periphery is connected to a funnel having a flange or a pipe for the connection to the filter shaft. As filter cloth, a cloth bag of shrinkable synthetic material is preferably used, as described above.

A folded plate affords generally a very stiff construction. In a construction according to the invention the flow characteristics and the strength properties cooperate by the fact that the height of the folds increases towards the inner periphery of the sector where both filtrate flow and bending moment are greatest. It has been proved, that also a very thin plate affords a construction which is stiffer than prior art constructions at the same time as the weight is lower.

BRIEF DESCRIPTION OF THE DRAWINGS

A preferred embodiment of the invention is in the following described more in detail with reference to the accompanying drawings, wherein FIG. 1 is a sideview of a sector of the illustrated embodiment, FIG. 2 is a section shown in the direction of the arrows A—A in FIG. 1, FIG. 3 is a section shown in the direction of the arrows B—B in FIG. 1, FIG. 4 is a section shown in the direction of the arrows C—C in FIG. 1, FIG. 5 is a diagram showing how the cleaning effect of the filter varies with the ratio flow/volume, and FIG. 6 is a diagram showing how the dry content of the dewatered mass varies with the ratio sector surface/sector volume.

DESCRIPTION OF THE PREFERRED EMBODIMENTS

FIG. 1 shows a folded plate 1. Ribs 2 and 3 are arranged around the sides and the outer periphery of the folded plate for protecting a filter cloth 4 from sharp edges on the plate 1 and the rib 3 furthermore assists in bracing up the folded plate 1 in the direction perpendicular to the folds 10. A funnel 6 forms a passage between the plate 1 and a flange 7 which connects the sector to a filtrate channel in a filter shaft 9. The filter cloth 4, which consists of a cloth bag shrunk over the sector, is fixed to the funnel 6 by fastening means 5 such as screws, pop rivets, plastic plugs or the like.

FIG. 2 shows how the saddles 12 of the folds form a deck or support for the filter cloth 4. The troughs 13 of the folds 10 together with the filter cloth 4 form radial filtrate channels 11 extending from the outer periphery of the sector inwardly towards the filter shaft 9.

FIG. 2 and 3 shows furthermore how the folds 10 and the filtrate channels 11 of the plate 1 from being very low adjacent the outer periphery become successively higher towards the inner periphery of the sector FIGS. 2 and 3 also show the triangular cross-section of the channels.

FIGS. 2 and 3 also show one embodiment, in which the rib 2 is a part of the folded plate 1 by bending the edges of the plate to form the rib. FIG. 4 illustrates another embodiment of the rib, viz a U-profile welded or riveted to the folded plate 1.

The bending radius for the saddles 12 of the folds 10 can be made as small as it is possible from a manufacturing point of view and still form a sufficient support for the filter cloth 4. By this fact and with regard taken to the distance which by way of experience is suitable to have between the folds 10, it is possible to achieve an open area for the deck supporting the filter cloth over 90%.

The plate material for most applications is rustfree steel or acidproof steel. In certain applications it can be advantageous to have a perforated plate with the effect that the cleaning spray has to a certain extent the possibility of flushing right through the perforations and clean the cloth from inside on the opposite side of the sector, whereby cleaning takes place both from inside and outside.

As an alternative to a plate of rustfree steel or acid-proof steel it can be made of folded synthetic material such as plastic.

The diagram of FIG. 5 shows how upon cleaning of a fiber containing backwater the efficiency of the filter increases with increased ratio flow/volume for a certain flow, i.e. the smaller sector volume the cleaner clear filtrate.

The diagram of FIG. 6 shows how upon the dewatering of fiber suspensions the substance content of the dewatered fiber mass increases with increased ratio between sector surface and the sector volume, i.e. the smaller sector volume the higher the dry content of the fiber mass.

The described effect concerning efficiency upon the cleaning of backwater and dry content upon dewatering can alternatively be utilized such that the efficiency and the dry content, respectively, remain unvaried and instead the capacity of the filter to a corresponding degree is increased.

The invention is not limited to be used only for disc filters for cleaning backwater and thickening of fiber suspensions within cellulose and paper industry, but can advantageously be used within all kinds of industries where disc filters are utilized, such as mining, coal and chemical industry.

Nor is the invention limited to disc filters in which the pressure difference over the filter medium is obtained by vacuum within the filter, but is just as useful for disc filters in which the pressure difference is caused by the level difference between the outside and the inside of the filter, so called gravity filters, or by overpressure on the outside of the filter, pressure filter.

I claim:

1. A rotating disc filter for dewatering a suspension comprising a shaft and a plurality of disc sectors having a plurality of internal radially extending filtrate channels for conveying and discharging filtrate to the shaft, said channels being defined by a fitted cloth through which dewatering takes place and folded means having saddles and troughs, said saddles forming support for said filter cloth said folded means consisting of only one corrugated disc element, and said corrugations being shaped to form filtrate channels having an increasing height towards said shaft and wherein the ratio of the area of the filter cloth to the volume of the filtrate channels is at least about 20 $dm^2/dm^3$.

2. A disc filter according to claim 1 wherein said filtrate channels are formed to have a cross-sectional area which increases towards said shaft.

* * * * *